Dec. 10, 1929.  G. S. MORISON  1,738,662
BALL TRANSMISSION
Filed Jan. 20, 1927
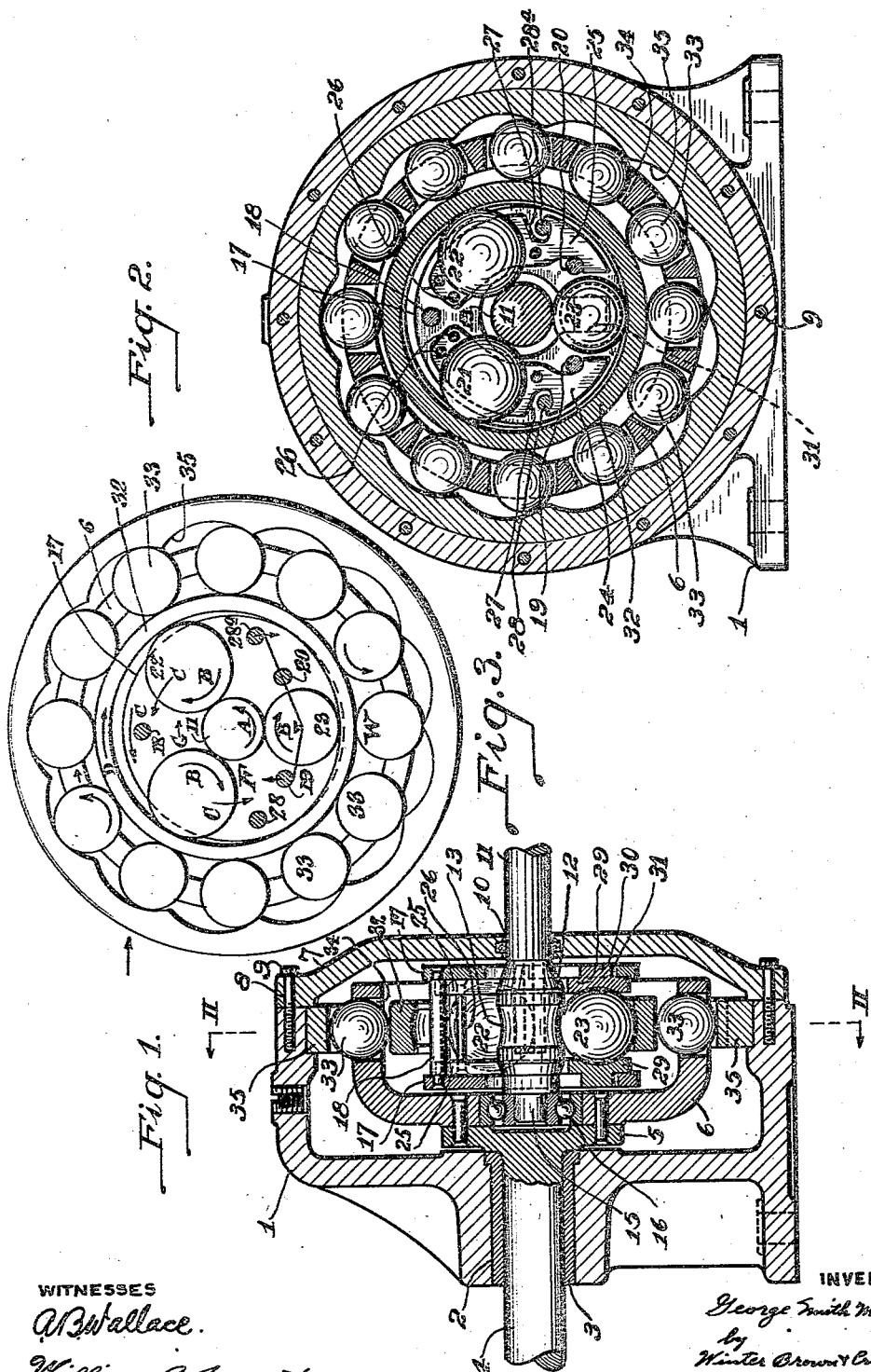
WITNESSES
A B Wallace.
William B Jaspert.
INVENTOR
George Smith Morison
by
Winter Brown & Critchlow
his attorneys.

Patented Dec. 10, 1929

1,738,662

UNITED STATES PATENT OFFICE

GEORGE SMITH MORISON, OF PITTSBURGH, PENNSYLVANIA, ASSIGNOR TO MORISON INCORPORATED, OF PITTSBURGH, PENNSYLVANIA, A CORPORATION OF DELAWARE

BALL TRANSMISSION

Application filed January 20, 1927. Serial No. 162,310.

This invention relates to power transmission and speed reduction mechanism, more particularly to roller friction transmissions.

In a copending application Serial No. 117,167, filed June 19, 1926, now Patent No. 1,634,507, dated July 5, 1927, is described a speed reduction mechanism embodying a roller transmission that is associated with a driving and driven element in such manner as to provide positive driving connection therebetween. The inner or thrust rollers are carried by a cage member that is coupled to or associated with the driven element, and an outer race is provided within which the rollers are contained, to function as a fulcrum track for the rollers, which in traveling thereon rotate their cage and the driven element attached thereto. In this type of transmission the outer race is subjected to a gyrating movement but is positively restrained against rotation. The gyrating movement is produced by an eccentric thrust determined by the difference in the diameters of the cage rollers, there being two rollers of equal diameter and one of a lesser diameter. This difference in diameters determines the amount of thrust which is the eccentric movement of the gyrating fulcrum ring or race.

In another copending application Serial No. 124,352 filed July 23, 1926, is disclosed an epicylic roller transmission which embodies an inner thrust roller transmission somewhat similar to that described in the first mentioned copending application and which in addition embodies an outer series of driving rollers that are associated with or carried by the driven element. The driving rollers, which may be called "rolling teeth" are displaced by the eccentric or gyrating movement of the inner roll race or ring, which forces the outer or driving rollers against a corrugated fixed fulcrum member. As the driving rollers are thus progressively thrust into the corrugations of the outer fixed fulcrum member they roll on that fulcrum, and so, rotate their carrier cage. By this arrangement a reduction of speed is obtained somewhat analogous to that obtained by wabble gear transmissions. In the last-mentioned application the gyrating ring, contrary to that in the first-mentioned copending application, is not positively restrained against rotatory movement, but is free to rotate during its gyrating movement as it may be driven by reaction of the outer driving rollers or teeth and the inner thrust rollers which respectively bear upon its outer and inner peripheries. This freedom of rotation is essential to provide a moving contact with the rolling teeth of the driven element.

The present invention relates particularly to means for effecting and maintaining the proper operative relation and relative positions of inner thrust roller members of the inner roller transmission with the driving shaft and the gyrating ring element that encloses and bears on the rollers. The tendency to displacement of the inner rollers is caused by the rotation of the gyrating ring or race member, the rotation and revolution of the inner thrust rollers themselves, and the reaction or back thrust on the gyrating ring when it is forcing the outer driving rollers into the corrugations of an outer fixed fulcrum member. The back thrust on the gyrating ring and its rotatory movement have a tendency to spread apart or separate the inner thrust rollers of the inner transmission in certain positions and under certain conditions.

It is among the objects of this invention to provide and maintain automatically a positive wedging action or gripping contact of the inner thrust rollers and their inner and outer races in a transmission system embodying the rotatory gyrating roller race.

Another object of the invention is to provide a positive wedging action of the inner thrust roller members which shall increase with the load on the driven element.

Another object of the invention is to provide means for producing a positive wedging action of the inner thrust roller transmission embodying simple features of construction and in which the wearing elements such as the rollers and races are readily accessible for inspection and renewal.

In the accompanying drawings constituting a part hereof and in which like reference characters designate like parts, Fig. 1 is a vertical sectional view partially in elevation of a power transmission device embodying the principles of this invention; Fig. 2 is a transverse sectional view thereof taken along the line II—II, Fig. 1; and Fig. 3 is a diagrammatic view of the roller transmission device illustrating the functional characteristics featuring the present invention.

Referring to Figs. 1 and 2 of the drawing, the structure therein illustrated comprises a housing member 1, having a central opening 2, provided with a journal bearing 3 for rotatably mounting a shaft 4 having a flanged end 5 to which is secured a roller retaining cage member 6, the shaft and cage 4 and 6, respectively, comprising the driven or slow speed element of the transmission device. Attached to the housing 1 is an end bracket 7 provided with openings 8 adapted to receive cap screws 9 for securing the bracket 7 to the member 1, as shown. Centrally of the bracket 7 is an opening 10 through which is projected a shaft 11 constituting a driving or high-speed element of the transmission mechanism.

The shaft 11 is provided with an enlarged body portion 12 having a face 13, constituting the race of a plurality of inner thrust rollers 21, 22 and 23 which roll upon that race about the shaft. The end of the shaft 11 is provided with a constricted portion 15 adapted to fit into the inner race of an antifriction bearing 16 which is secured in the cage member 6 of the driven element, the shafts 11 and 4 being adapted for relative rotatory movement. The rollers 21, 22 and 23 are carried by a cage member comprising a pair of side plates 17 joined by fixed rivets 18, 19 and 20 to hold them in proper spaced relation, the roller members 21, 22 and 23 being rotatably secured between the plates 17.

Two of the thrust roller members 21 and 22 are of equal diameter and larger than a third roller member 23. The larger rollers 21 and 22 are each disposed between a pair of bearing pads 24 and 25 the cheeks of which are secured in proper spaced relation by rivets or pins 26. The pad members are recessed to engage or seat the rollers in a fixed position and they are mounted between the side plates 17 of the cage member by assembling them with their offset ends resting against the fixed rivets 19 and 20 as shown in Fig. 2. The pads 24 and 25 are respectively provided with recesses 27 which when in the position shown in Fig. 2, that is, with the roller members 21 and 22 pressed against the shaft 11 will register with openings provided in the side plates 17 through which removable locking pins 28 and 28ª are disposed. These pins function to hold the pads in their normal position relative to the cage, as shown in Fig. 2, and to hold them in the cage member.

To dismember the roller elements from the cage it is only necessary to remove the pins 28 which permit the pads to fall away from the fixed rivets 19 and 20 and the shaft 11, and they may then be removed from the side plates 17 of the cage.

The roller 23 is mounted to be movable with the cage element, but not independently thereof, by disposing the roller between bearing elements 29 having tongues 30 provided thereon which are disposed in slotted openings 31 of the side plates 17 whereby this roller member is radially movable in the cage, or the cage is similarly movable relative to said roller.

Disposed around and bearing upon the thrust roller members 21, 22 and 23 is a race or ring 32, eccentrically disposed with respect to the axis of shaft 11 when assembled around the thrust rollers on account of the differences in the diameters of the large rollers 21 and 22 and the small roller 23. The amount of eccentricity of the ring 32 will be hereinafter referred to as the thrust of the ring. The eccentric movement of the ring 32 will be hereinafter termed the gyrating movement of the inner race and this movement is utilized in connection with a series of rolling teeth or outer driving rollers 33, disposed in slots or openings 34 of the cage member 6. The cage 6 and the attached shaft 4 constitute the driven element. The rolling teeth or driving rollers 33 cooperate with an outer fixed corrugated race, or fulcrum member 35, carried by the housing member 1. The corrugations of the fulcrum member have a radius equal to the diameter of the driving rollers 33 and there are more corrugations by one than there are driving rollers.

As shown in Fig. 2 all of the driving rollers 33 are at all times contacting with the ring 32 and also with the corrugated face of the fulcrum member 35, and when movement is imparted to the driving rollers or rolling teeth 33 by the thrust of the gyratory ring 32 they are all moved into, and out of, the corrugations of the fulcrum member 35 traveling toward the approaching thrust side of the gyratory ring. This movement of the driving rollers imparts rotation to the cage member 6, and the driven shaft to which the cage 6 is attached, in a direction opposite to that of the driving shaft at a much lower speed than that of rotation of the driving shaft 11.

In Fig. 3 of the drawings the thrust rollers, driving rollers, and driven elements, and the gyratory thrust ring, are diagrammatically illustrated for the purpose of explaining their respective functions and their cooperative relation in the operation of the transmission mechanism. The location of the rollers, housing, shaft, ring and cage member in Fig. 3 corresponds to their respective locations in Fig. 2, and assuming the direction of the driving shaft 11 to be counter-clockwise as indicated by the arrow A, the thrust rollers 21, 22 and 23 will respectively rotate in the direction shown by arrows B placed thereon, and they will at the same time revolve about the driving shaft in the direction of rotation of that shaft, i. e., counter-clockwise. The cage element laterally enclosing the inner rollers is free to rotate and it will travel with the inner or thrust rollers 21, 22 and 23 about the inner shaft 11 in the direction shown by the arrow C. If the cage member were restrained against that movement the friction grip of the driving shaft 11 and the gyratory thrust ring 32 on the intermediate roller members 21, 22 and 23 would tend to cause the ring 32 to rotate in clockwise direction as shown by the arrow D. Since, however, the cage member carrying the inner rollers is free to rotate, the thrust ring 32 is free to rotate in either direction and at any speed, so far as the inner thrust rollers are concerned.

Upon rotation of the driving member 11, the thrust ring 32 is subjected to gyrating movement on account of the differences in the diameters of the inner thrust rollers and by that force the outer driving rollers 33 will be successively rolled into and out of the corrugations of the fulcrum member 35, in the direction of rotation and revolution as shown by the arrows thereon. The thrust is progressively applied in counter-clockwise order, and thus is effective in moving the entire series of driving rollers or teeth 33 clockwise into the groves of the corrugations of the fulcrum member. The driving rollers individually in this case rotate counter-clockwise.

Beginning at the lowermost driving roller W as illustrated in Fig. 3, which is at the peak between two corrugations, this roller will rotate counter-clockwise and hence move clockwise down the incline of the corrugations to its left, while at the same time all the other rollers 33 will also move clockwise in their respective corrugations, as shown.

The rolling teeth on the right side during the movement just referred to are merely rolling out of their respective corrugations in the fulcrum member 35, and thereby not offering any resistance to the thrust ring 32. The rolling teeth on the left side, however, are the working rollers for counter-clockwise movement of the driving shaft 11 at the positions shown in Fig. 3, and the rolling teeth on the right hand side are the idle rollers.

The forcing of the driving rollers 33 into their corrugations on the left side produces a back thrust or reaction from the fulcrum member 35, and this back thrust or reaction against the ring 32 produces a reaction against the inner rollers 21 and 23 onto shaft 11, tending to spread the rollers 21 and 23 around the inner shaft 11. If this spreading tendency were not counteracted the inner roller 21 would be moved clockwise into the wider space between the ring 32 and shaft 11, away from the smaller roller 23, while the small roller 23 would also tend to move in the opposite direction away from roller 21 toward the wider space. If this happened the wedging effect of the thrust rollers between the inner shaft 11 and ring 32 would be lost and slippage would result.

Since the successful and efficient operation of this type of inner drive mechanism is necessarily dependent upon the so-called wedging effect of the thrust rollers between the drive shaft and thrust ring it is necessary where heavy loads are involved to provide means for preventing the thrust rollers from moving relatively in the direction of the widened space between the shaft 11 and ring 32. The wedging effect of the inner rollers 21 or 22 is maintained by securing the inner rollers in the manner hereinbefore described between the pad members 24 and 25 and securing the latter in the cage by the fixed rivets 19 and 20 and the removable pins 28 and 28ª, as shown. The smaller inner roller 23 being mounted to be revolvable with the cage member but not movable independent thereof, except in its slot 31, will constitute a fulcrum or pivot about which the cage may exert a pull against the large inner rollers 21 and 22 by virtue of the connection of the bearing pads in which they are contained, with the fixed rivets 19 and 20 of the cage member.

Referring again to the diagram of Fig. 3 the reaction tending to separate the inner roller thrust members 21 and 23 is utilized to exert a pull on the roller member 22 to cause the latter to advance into the narrowing space in the direction of the pivot roller 23. This is accomplished by applying the pull upwardly (as shown by an arrow F) exerted by the roller 21 to the fixed rivet 19 of the cage, the rivet 19 engaging the lower portion of the roller bearing pad 24. This upward pull against the cage through the rivet 19 is exerted against the small roller 23 which acts as a fulcrum or pivot point for the cage member. Since the roller 23 is only pivotally and radially movable relatively to the cage, the latter will tend to move angularly in the direction of the pull as shown by the arrow G, and by virtue of the engagement of pin 28ª with the pad 25 the latter will be pulled downwardly carrying the roller 22 with it, thus making roller 22 the wedging roller.

The distance between the fixed rivet 19 and the center of the fulcrum roller 23 is materially less than the distance from the fulcrum roller 23 to the pin 28ª, so the tendency will be for the roller 22 to be moved a greater distance in the direction of the small roller 23 than the roller 21 moves away from the roller 23. It therefore follows that the greater the tendency is to separate the rollers 21 and 23 the greater will be the force acting through the thrust-roller cage as a lever to wedge or force the roller 22 into the restricted space between the drive shaft 11 and the thrust ring 32, i. e. toward the pivot roller 23.

This force will vary with the load on the driven element, and any movement of roller 21 away from roller 23 will cause a greater movement in the same circumferential direction of roller 22. This arrangement at all times assures a positive wedging action for the transmission of power from the driving to the driven element without slippage of the inner roller members.

For the reverse direction of rotation of the drive shaft 11 the inner rollers 22 and 23 will be the working thrust members forcing the driving rollers or rolling teeth 33 into the corrugations of the fulcrum member 35 and the inner roller 21 will be the wedging or gripping roller so called, as it has a tendency to wedge itself between the thrust ring 32 and the driving shaft 11. For this direction of rotation the separating tendency between rollers 22 and 23 exerts an upward pull on the fixed rivet 20, and a downward pull on the pin 28 associated with the roller bearing pad 24, and hence upon roller 21, in the same proportion as stated in connection with the counter-clockwise movement of the shaft as illustrated.

The manner of mounting the inner rollers on bearing pads secured to the cage element as described, will at all times provide intimate contact between the driving and driven elements, and the tendency is to increase the contact grip with increase in the load. This provides a positive automatically maintained driving connection between the driving shaft, thrust rollers, and gyratory ring of the transmission device.

Although spherical members are illustrated for producing the thrust of ring 32, and as driving rollers, it will be understood that cylindrical rollers may be used in either or both series.

I claim:

1. In a roller transmission comprising a central shaft, a plurality of revolvable rollers spaced apart around and bearing on the shaft, two of said rollers being of unequal diameters, a rotatable ring enclosing and bearing upon the said rollers and eccentrically positioned with respect to the shaft, and means to insure maintenance of properly spaced relation of the rollers to each other and to their inner and outer raceways, said means comprising a cage pivotally connected to one of the rollers and movable with respect to the other rollers, a bearing member attached to a second roller and a connection from said bearing member to the cage whereby movement of the second roller away from the pivot roller tends to rock the cage on the said pivot roller, a second bearing member attached to a third roller and a connection from the second bearing member to the cage, whereby rocking of the cage on the pivot roller caused by movement of the second roller away from the pivot roller causes movement of the third roller member toward the pivot roller.

2. In a roller transmission comprising a central shaft, a plurality of revolvable rollers spaced apart around and bearing on the shaft, two of said rollers being of unequal diameters, a rotatable ring enclosing and bearing upon the said rollers and eccentrically positioned with respect to the shaft, means to insure maintenance of properly spaced relation of the rollers to each other and to their inner and outer raceways, said means comprising a lever member connected to one of the rollers as a pivot and movable with respect to the other rollers, a bearing member attached to a second roller and a connection from said bearing member to the lever member, whereby movement of th second roller away from the pivot roller moves the lever member on the said pivot roller as a fulcrum, a second bearing member on a third roller, and a connection from the second bearing member to the lever member, whereby movement of the lever member relative to the pivot roller caused by movement of the second roller away from the pivot roller causes movement of the third roller member toward the pivot roller.

3. In a roller transmission comprising a central shaft, a plurality of revolvable rollers spaced apart around and bearing on the shaft, two of said rollers being of unequal diameters, a rotatable ring eccentrically positioned with respect to the shaft enclosing and bearing upon the said rollers, means to insure maintenance of properly spaced relation of the rollers to each other and to their inner and outer raceways, said means comprising a lever member bearing on one roller as a pivot and connected to the next adjacent rollers on each side of the pivot roller, whereby movement of either adjacent roller away from the pivot roller drives the other adjacent roller toward the pivot roller.

4. In a roller transmission comprising a central driving shaft, three revolvable rollers spaced apart around and bearing on the shaft, one of said rollers being of less diameter than the two other rollers, a rotatable ring eccentrically positioned with respect to the shaft enclosing and bearing upon the said rollers, the shaft and ring forming inner and outer raceways for the rollers, the ring being adapted to drive an exterior mechanism by force of its eccentric thrust movement, and means to insure maintenance of properly spaced relation of the rollers to each other and to their inner and outer raceways, said means comprising a cage enclosing the two larger rollers and connected to the smaller roller as a pivot and movable with respect to the larger rollers, a bearing member attached to the first of the larger rollers and a connection from said bearing member to the cage, whereby movement of the first large roller away from the smaller roller tends to rock the cage on the said small roller as a pivot, a second bearing member on the second large roller, and a connection from the cage to the said second bearing member, whereby movement of the cage about the small roller caused by movement of the first large roller away from the pivot roller causes movement of the second large roller toward the small roller.

5. In a roller transmission comprising a central shaft, a plurality of revolvable rollers spaced apart around and bearing on the shaft, one of said rollers being of less diameter than the others, a rotatable ring eccentrically positioned with respect to the shaft enclosing and bearing upon the said rollers, the smallest roller being positioned between the shaft and ring at the narrowest part of the space between them, means to insure maintenance of properly spaced relation of the rollers to each other and to their inner and outer raceways, said means comprising a cage pivotally connected to the smallest of the rollers and movable with respect to the other rollers, a bearing member attached to a second roller and a connection from said bearing member to the cage whereby movement of the second roller away from the smallest roller tends to rock the cage on the said small roller as a pivot, a second bearing member attached to a third roller and a connection from the second bearing member to the cage, whereby rocking of the cage on the small pivot roller caused by movement of the second roller away from the pivot roller causes movement of the third roller member toward the pivot roller.

6. In a roller transmission comprising a central shaft, a plurality of revolvable rollers spaced apart around and bearing on the shaft, one of said rollers being of less diameter than the others, a rotatable ring eccentrically positioned with respect to the shaft enclosing and bearing upon the said rollers, means to insure maintenance of properly spaced relation of the rollers to each other and to their inner and outer raceways, said means comprising a lever member connected to the smallest of the rollers as a pivot and movable with respect to the other rollers, a bearing member attached to the adjacent roller on one side of the smallest roller and a connection from said bearing member to the lever member, whereby movement of the second roller away from the pivot roller moves the lever member on the said pivot roller as a fulcrum, a second bearing member on the adjacent roller on the other side of the smallest roller, and a connection from the said second bearing member to the lever member, whereby movement of the lever member about the smallest roller caused by movement of the second roller away from the smallest roller causes movement of the third roller member toward the smaller roller.

7. In a roller transmission comprising a central shaft, three revolvable rollers spaced apart around and bearing on the shaft, two of said rollers being of larger diameter than the third, the smallest roller being positioned on the line of the shortest distance between the shaft and ring, a rotatable ring eccentrically positioned with respect to the axis of the shaft and enclosing and bearing upon the said rollers, and automatic means to insure maintenance of properly spaced relation of the rollers to each other and to their inner and outer raceways, said means comprising a lever member bearing on the smallest roller as a pivot and connected to the other rollers on each side of the pivot roller, whereby movement of either of the larger rollers away from the pivot roller drives the other adjacent roller toward the pivot roller.

8. The combination with a roller transmission mechanism comprising a central rotary member surrounded by rollers spaced apart, one being smaller than the others, and a ring member eccentric to the central member and bearing upon the rollers, adapted for the transmission of power from one to the other of said elements, of automatic means operated by relative displacement of said rollers for maintaining said rollers wedged between the surfaces of the said members with which they are engaged.

9. In a roller transmission mechanism, the combination with a drive element and a surrounding driven element, of a plurality of rollers some of which are of unequal diameter, adapted for the transmission of power from one to the other of said elements, and means associated with said rollers for causing them to be wedged between the surfaces of the said elements, said means being actuated by relative movement of said rollers in their plane of revolution, and responsive to variation of load on said driven element.

10. In a roller transmission mechanism, the combination with a drive and a surrounding driven element, of a plurality of intermediate rollers, some of which are of unequal diameter, adapted for the transmission of power from one to the other of said elements, and means attached to two of said rollers for causing said rollers to be wedged between the surfaces of the said elements, said means being adapted to be actuated by relative displacement of said rollers.

11. In a roller transmission mechanism the combination with a drive and a driven shaft of a roller retaining cage member, a plurality of unequally sized rollers associated with said cage and adapted for engagement with said drive shaft, a roller race disposed around said rollers and adapted for gyrating and rotating movement thereon, and means associated with some of said rollers for causing one or more of said rollers to wedge between said drive shaft and roller race, said cage functioning as a lever for the wedging of said rollers.

12. In a roller transmission mechanism the combination with a drive and driven shaft, of a cage member, a plurality of rollers carried by said cage, some of said rollers being of unequal sizes, an eccentric roller race freely disposed around said rollers and adapted for gyrating and rotating movement thereon, a second cage member secured to rotate with said driven shaft, rollers mounted for radial movement therein, a corrugated ring disposed around said last named rollers and secured against rotation, and means associated with the first named cage and responsive to the thrust of the gyrating race against the rollers of the last named cage for wedging one or more of its rollers between the drive shaft and the said race.

In testimony whereof, I sign my name.

GEORGE SMITH MORISON.